Aug. 30, 1932.   W. H. DELAHAYE   1,874,921
BRAKE
Filed Dec. 2, 1929

INVENTOR:
WALTER H. DELAHAYE.

BY   ATTORNEY

Patented Aug. 30, 1932

1,874,921

UNITED STATES PATENT OFFICE

WALTER H. DELAHAYE, OF OTTAWA, ONTARIO, CANADA, ASSIGNOR TO BENDIX BRAKE COMPANY, OF SOUTH BEND, INDIANA

BRAKE

Application filed December 2, 1929. Serial No. 410,935.

This invention relates to cam-operated brakes and has for object to overcome a fault inherent in this type of brake, which, although not apparent when the brake is new, is nevertheless present and which, when the brake is worn, greatly decreases the efficiency with which it operates.

An analysis of the forces exerted by a cam on the ends of the brake shoes will show that these are quite unequal when a symmetrical cam is used. Such a cam when moving into operative position causes a thrust on both shoes in a direction which is parallel to a line tangential to the brake drum and which is normal to a radial line which passes through the axis of the cam shaft. But in addition to this force, a considerable force is exerted due to the frictional engagement of the cam on the shoes and which acts in the direction of movement of the cam. In one case this component augments the applying component of the force, but in the other case it counteracts it. When the brakes are new and this frictional component is small the defect is not so objectionable, but when the ends of the shoes have become worn and no longer present a smooth plane surface, it is quite objectionable. To overcome this it is now a common practice to provide rollers to engage the cam but it is the object of this invention to avoid this more costly construction and yet obtain a satisfactory operation of the brake throughout its useful life.

The drawing attached hereto shows diagrammatically and by way of example a convenient means for carrying the invention into effect.

Figure 1:
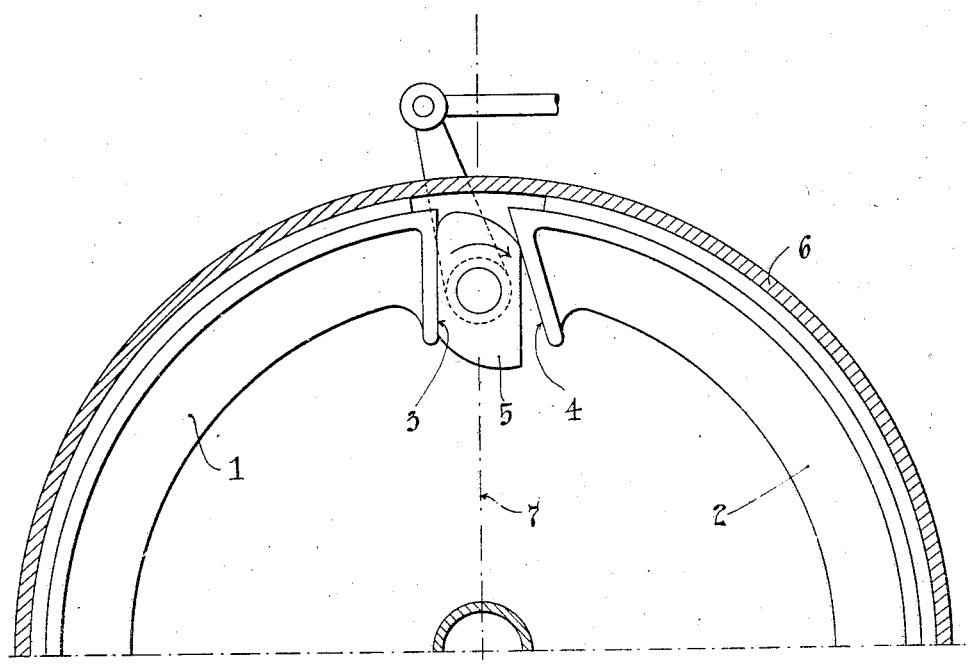
Figure 1 is a sectional elevation of part of a cam brake showing the improved construction of the cam-engaging surface.

Reference to Figure 1 will show that the two shoes 1 and 2 have flat surfaces 3 and 4 engaged by a cam 5 which operates in the direction shown by the arrow to apply the shoes to the brake drum 6. It will be noted that these surfaces 3 and 4 are not quite parallel, as they have been made heretofore, but at least, that surface which is engaged by that end of the cam which moves inwardly when operated to apply the brake is inclined relatively to the radial line 7 passing through the axis of the cam. The advantages of this construction will be apparent from the description of the operation of cam brakes offered above.

Figure 2:
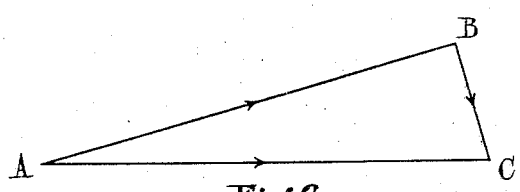
Figure 2 is a diagram of the forces acting on the improved type of shoe.
Figure 3:
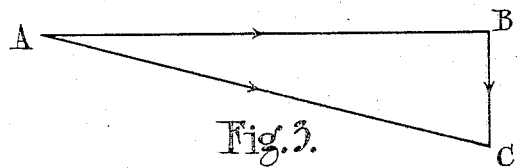
Figure 3 is a similar diagram applied to the common type of shoe.

Referring now to the diagram shown in Figures 2 and 3, the non-tangential thrust is represented by the line AB which in Figure 2 is normal to the inclined cam-engaging surface 4. The line BC shows the direction of the frictional component on the inclined surface, and the line AC shows a resultant force which is parallel to the tangent and at right angles to a radial line 7. Such a resultant avoids the objectionable inward thrust on the shoe. Figure 3 shows the same forces as they exist in the common type of brake and the difference in the direction of the resultant will be apparent.

In the drawing the inclination of the cam-engaging surface is shown as being at a considerable angle for the purpose of more clearly illustrating the invention. In practice it may be found that a suitable angle is one that is much smaller than that shown.

It will be understood that the invention may be applied to any type of cam-operated brake and that the drawing is purely exemplary in character, all details being omitted for clearness of illustration of the invention.

It will also be understood that many modifications may be made within the scope of the appended claims without departing from the invention.

What I claim is:

1. In a cam-operated brake, the combination of a pair of shoes and a cam for expanding same, cam-engaging surfaces on the shoes, one of said surfaces being so disposed in regard to the cam that the resultant of the expanding force and the inward forces due to the frictional engagement of the cam on the shoe lies in a plane normal to the radial plane passing through the axis of the cam.

2. In a cam-operated brake, the combination of a pair of shoes and a cam for expanding same, cam-engaging surfaces on the shoes, the surface engaging that end of the cam which has an inward movement being so disposed in relation thereto that the inward force of the cam due to the frictional engagement between the cam and the shoe is counteracted.

3. A brake having the features set forth in claim 2, wherein the surface engaging the inwardly moving end of the cam is inclined to the radial line passing through the axis of the cam and closest thereto at its outer extremity.

4. A brake comprising a fixed support, a friction element positioned thereon having separable ends one of which is inclined to the other, a cam so cooperating with the separable ends that the force applied to the inclined end lies in a plane normal to a radial plane of the fixed support passing through the axis of the cam.

In testimony whereof I have affixed my signature.

WALTER H. DELAHAYE.